Sept. 3, 1929. P. E. FENTON 1,726,890
SELF LOCKING PIN FASTENER
Filed May 8, 1928
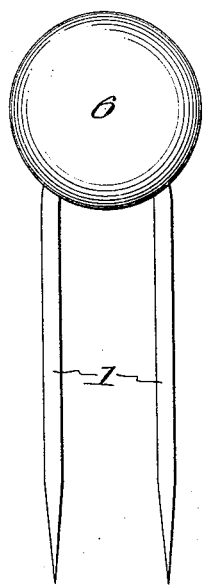
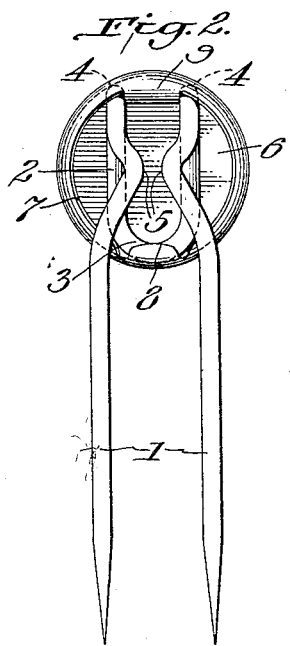
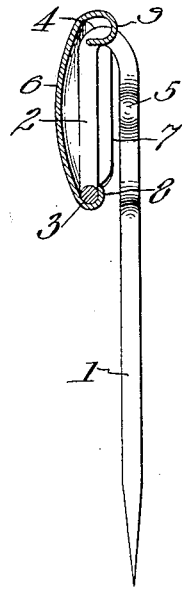
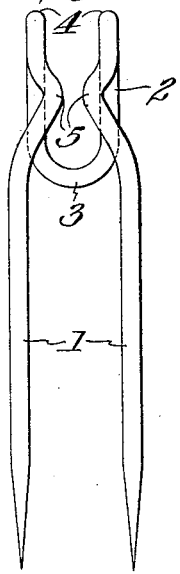

Patented Sept. 3, 1929.

1,726,890

UNITED STATES PATENT OFFICE.

PAUL E. FENTON, OF THOMASTON, CONNECTICUT, ASSIGNOR TO SCOVILL MANUFACTURING COMPANY, OF WATERBURY, CONNECTICUT, A CORPORATION OF CONNECTICUT.

SELF-LOCKING PIN FASTENER.

Application filed May 8, 1928. Serial No. 276,099.

This invention relates primarily to the type of pin fasteners used for securing covers to automobile seats and other parts, and also useful for other purposes, in which there is a pin element supplied with a cap or shell, the pin in the first instance being adapted to secure the cover or other article in place by a pinning action; or the pin may be constructed to serve as or in connection with either element of a snap fastener, as is well known.

The pin of this invention is a modified form of the pin forming the support for the cap or shell of the Boden, King & Chapman Patent, No. 1,604,801, dated October 26, 1926, and the cap or shell herein may be secured to the head of the pin substantially as in the patent referred to.

The present invention consists in applying to the legs of the pin, inwardly deflected wave-like obstructions, which contract the space between the legs of the pin and make it difficult for the accidental escape of the pin, and to this end the legs of the pin are bent inwardly next to the pin head, with the sticking ends of the legs spaced apart to a greater distance than the nearest approaches of the bent portions or obstructions, so that in using the pin a quantity of material is gathered in between the legs and crowded together to pass the obstructions and then allowed to expand in the space between the legs above the obstructions, thus forming a locking feature at the points of least resiliency in the pin structure, to retain the pin in set position and resist the accidental displacement of it and requiring some force to displace or withdraw the pin, as I will proceed now to explain more fully and finally claim.

In the accompanying drawings illustrating the invention, in the several figures of which like parts are similarly designated, Figure 1 is a front elevation; Fig. 2 is a rear elevation and Fig. 3 is a longitudinal section of one form of pin embodying this invention. Fig 4 is a rear elevation of the pin itself detached.

The pin itself comprises a length of wire bent upon itself so as to form the legs 1, which are pointed at their ends, and a head formed by the overlying looped member 2 having the bend 3 and the humped portions 4. Adjacent to the head, the legs are bent toward one another but without meeting, to form the wave-like obstructions 5 which are located at a distance slightly below the humped portions 4.

A cap or shell 6, shown as having a flange 7 on its back, is applied to the head of the pin by the engagement of the humped portions 4 of the pin with the upper portion of the flange and its bend 3 with a tongue 8 projecting from the cap or shell and overturned upon the bend. A lug 9 projecting from the flange enters between the humped portions so as to keep these portions properly spaced apart.

The cap or shell 6 may be used simply as a finish, or it may constitute wholly or in part one element of a snap fastener; and in any case it is applied to and incloses the looped head and covers the obstructions in the legs.

Inasmuch as the legs are spaced apart below the cap or shell a greater distance than the distance between the obstructions 5 and are more resilient, that is to say, yield more readily than the legs above the obstructions where there is less resilience, it follows that the width of cloth or other material in which the pin has been stuck will be gathered in or compressed by said legs in order to pass the obstructions and after it passes the obstructions, it expands or unfolds in the space between the legs above the obstructions and the pin is thereby locked in set position so firmly as to prevent its accidental escape and to require considerable force to detach it.

As will be seen, the principle involved in the construction and operation of this pin fastener resides in the introduction of a quantity of material determined by the distance between the pin points, and forcing this quantity of material up toward the top and over a wave-like obstructive structure toward the humps. As already observed, the wire of the pin is most resilient near the points of the pin and the resiliency decreases as the humps are approached. When the pin is being mounted or set the material has the benefit of more resiliency through the lateral expansion of the pin legs than when it comes off, for the reason that the obstructions or retaining part of the lock is nearer the top of the legs.

One purpose of bending the looped head over the legs is to provide sufficient space between the legs and the looped head and its attached cap or shell to permit the pin to be driven into the material clear to its humped portions or humps.

Variations in the details of construction are permissible within the principle of the invention and the scope of the claims following.

What I claim is:—

1. A self-locking pin fastener, comprising a pin member having spaced apart legs and an overlying looped head, the legs of the pin adjacent to said looped head being deflected inwardly and these deflections spaced apart.

2. A self-locking pin fastener, comprising a pin member having spaced apart legs and an overlying looped head, the legs of the pin adjacent to said looped head being deflected inwardly without coming into contact.

3. A self-locking pin fastener, comprising a pin member having spaced apart legs and a looped head, said looped head overlying the adjacent portion of the legs, the legs of the pin adjacent to said looped head being deflected inwardly in wave lines.

4. A self-locking pin fastener, comprising a pin member having spaced apart legs and a looped head overlying the adjacent portions of the legs, the legs of the pin adjacent to the head being deflected inwardly and these deflections spaced apart for a distance less than the spaced apart legs, and a cap or shell applied to and enclosing the looped head.

5. A self-locking pin fastener, having spaced apart and pointed legs and an overlying looped head, the legs next to said looped head being contracted toward one another to form obstructions, and a cap or shell applied to and circumscribing the looped head and facially covering said obstructions, the legs of the pin being spaced apart a greater distance than the distance between the contracted portions, thereby to compress the material on which the pin is set as it nears and passes the obstructions, the material thereafter expanding between the legs above the obstructions so as to lock the pin in set position and thereby resist accidental detachment or escape.

In testimony whereof I have hereunto set my hand this 7th day of May, A. D. 1928.

PAUL E. FENTON.